United States Patent
Williams et al.

(10) Patent No.: US 12,542,670 B2
(45) Date of Patent: Feb. 3, 2026

(54) PROCESSING SYSTEM USING SECRET LINKED TO MULTIPLE ACCOUNTS

(71) Applicant: Visa International Service Association, San Francisco, CA (US)

(72) Inventors: Otto Williams, Dubai (AE); Desmond Godfrey Sullivan, Dubai (AE); Harsha Sathyanarayana Naga, Dubai (AE); Ranveer Raj Jain, Dubai (AE); Amal Jose Thomas, Dubai (AE); Stylianos Panagiotis Michaelides, Dubai (AE)

(73) Assignee: Visa International Service Association, San Francisco, CA (US)

( * ) Notice: Subject to any disclaimer, the term of this patent is extended or adjusted under 35 U.S.C. 154(b) by 131 days.

(21) Appl. No.: 18/623,413

(22) Filed: Apr. 1, 2024

(65) Prior Publication Data

US 2024/0333506 A1    Oct. 3, 2024

Related U.S. Application Data

(60) Provisional application No. 63/493,630, filed on Mar. 31, 2023.

(51) Int. Cl.
  *H04L 9/32* (2006.01)
(52) U.S. Cl.
  CPC .......... *H04L 9/3213* (2013.01); *H04L 9/3226* (2013.01)

(58) Field of Classification Search
  CPC .......................... H04L 9/3213; H04L 9/3226
  See application file for complete search history.

(56) References Cited

U.S. PATENT DOCUMENTS

| | | | | |
|---|---|---|---|---|
| 8,851,366 B2* | 10/2014 | Modi | .................... | G06Q 20/02 |
| | | | | 705/79 |
| 10,509,779 B2* | 12/2019 | Chipman | ............. | G06Q 20/367 |
| 11,128,464 B1* | 9/2021 | Loladia | .................... | H04L 9/08 |
| 11,190,516 B1* | 11/2021 | Loladia | ............... | H04L 63/0876 |
| 2018/0349884 A1* | 12/2018 | Sharma | .............. | G06Q 20/3276 |
| 2019/0251590 A1* | 8/2019 | Bodington | ............. | G06Q 30/02 |
| 2019/0295054 A1* | 9/2019 | Purves | ................ | G06Q 30/0226 |
| 2020/0228520 A1* | 7/2020 | Thampi | ................. | H04L 9/3271 |
| 2023/0102341 A1* | 3/2023 | Chiang | ............... | H04L 63/0807 |
| | | | | 726/8 |
| 2024/0089249 A1* | 3/2024 | Richardson | ......... | H04L 63/1475 |

* cited by examiner

*Primary Examiner* — J. Brant Murphy
(74) *Attorney, Agent, or Firm* — Kilpatrick Townsend & Stockton LLP

(57) ABSTRACT

A method is disclosed. The method includes receiving from a user device operated by a user via a first channel, a user device identifier and a secret associated with the user. The method also includes storing a first token, the user device identifier, and a first channel identifier. The first token is associated a credential. The method also includes receiving, from the user device via a second channel, the user device identifier and the secret. The secret is subsequently validated. After the secret is validated, the server obtains a second token based on the first token and stores the second token, the user device identifier, and a second channel identifier. The second token is associated with the credential.

20 Claims, 9 Drawing Sheets

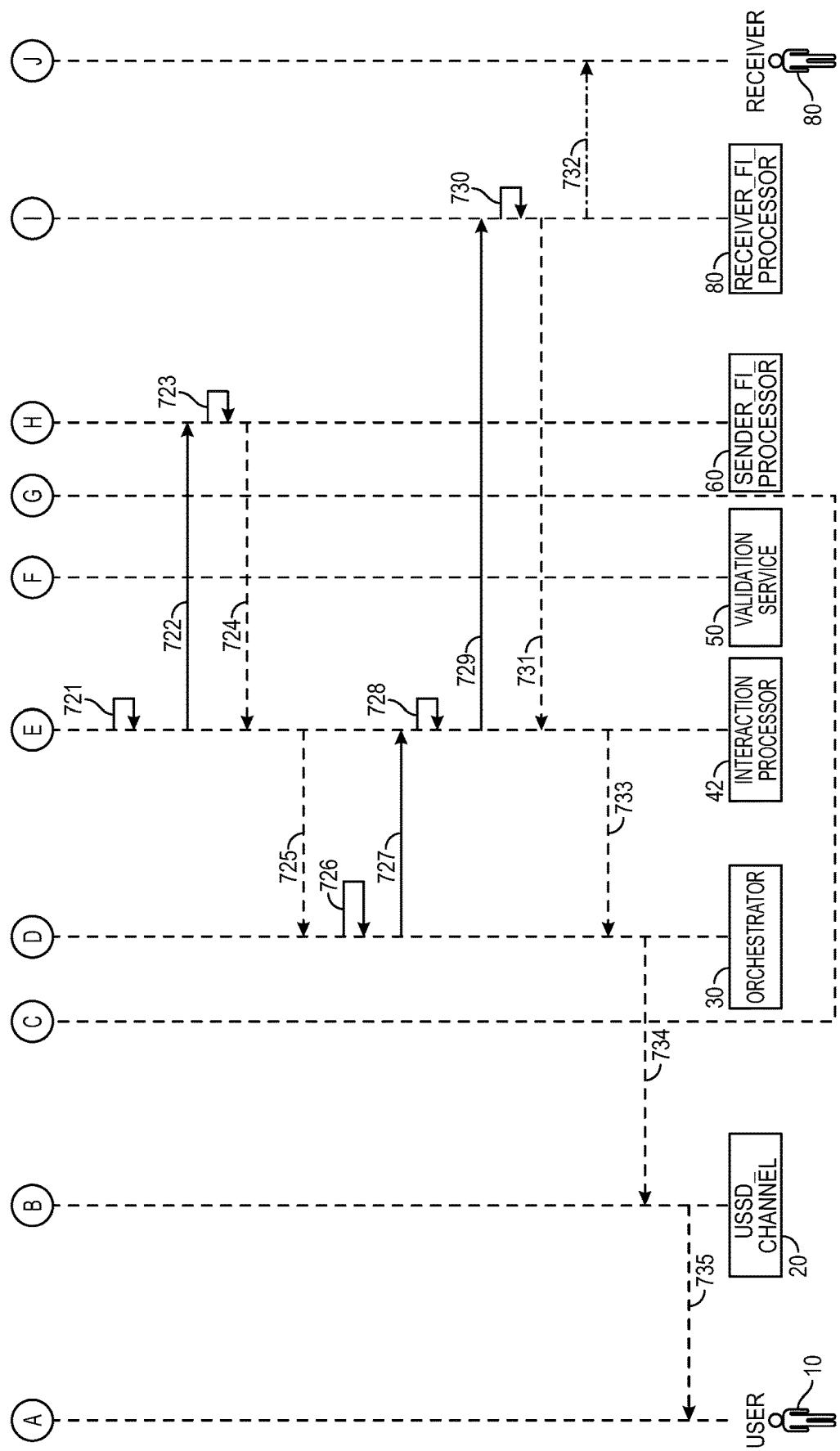

PROCESSING SYSTEM USING SECRET LINKED TO MULTIPLE ACCOUNTS

CROSS-REFERENCE TO RELATED APPLICATIONS

This application is a non-provisional of and claims the benefit of U.S. Provisional Application No. 63/493,630, filed on Mar. 31, 2023, which is herein incorporated by reference in its entirety.

BACKGROUND

Users can use a user device to interact with different channels to access credentials. A channel can be an entry point or gateway for accessing credentials such as account credentials. One example of a channel can be a communication channel such as a USSD (Unstructured Supplementary Service Data) channel. Another example of a channel can be a service such as WeChat™ or Facebook™.

If the user uses multiple channels, the user may wish to register a credential such as a user identifier (e.g., driver's license number, social security number, etc.) or an account number with each channel. The registration process requires the user to perform a significant number of actions. The actions can include entry of the credential with each channel, and performing multiple authentication steps.

Another problem that exists with respect to current registration processes associated with different channels is that credentials can be exposed during the registration processes. When credentials are transmitted via or to the channels by user devices operated by users, the credentials are exposed to hackers as well as intermediaries who may conduct man-in-the-middle attacks.

Another problem that exists is that the credentials can be exposed during interactions (e.g., transactions) that are conducted using the credentials.

Embodiments of the invention address these and other problems individually and collectively.

BRIEF SUMMARY

One embodiment incudes a method comprising: receiving, by a server from a user device operated by a user via a first channel, a user device identifier; receiving, by the server from the user device via the first channel, a secret associated with the user; storing, by the server, a first token, the user device identifier, and a first channel identifier associated with the first channel, wherein the first token is associated a credential; receiving, by the server from the user device via a second channel, the user device identifier and the secret, wherein the secret is subsequently validated; after the secret is validated, obtaining, by the server, a second token based on the first token; and storing, by the server, the second token, the user device identifier, and a second channel identifier, wherein the second token is associated with the credential, wherein the first token enables the user to conduct a first interaction with using the first channel and the second token enables the user to conduct a second interaction using the second channel.

Another embodiment of the invention includes a system comprising: one or more processors; and one or more computer readable media comprising code, executable by the processor to perform operations comprising: receiving, from a user device operated by a user via a first channel, a user device identifier; receiving, from the user device via the first channel, a secret associated with the user; storing a first token, the user device identifier, and a first channel identifier associated with the first channel, wherein the first token is associated a credential; receiving, from the user device via a second channel, the user device identifier and the secret, wherein the secret is subsequently validated; after the secret is validated, obtaining a second token based on the first token; and storing the second token, the user device identifier, and a second channel identifier, wherein the second token is associated with the credential, wherein the first token enables the user to conduct a first interaction with using the first channel and the second token enables the user to conduct a second interaction using the second channel.

Another embodiment of the invention includes a method comprising: transmitting, by a user device operated by a user to a server via a first channel, a user device identifier; transmitting, by the user device to the server via the first channel, a secret associated with the user, wherein the server stores a first token, the user device identifier, and a first channel identifier associated with the first channel, wherein the first token is associated a credential; and transmitting, by the user device to the server via a second channel, the user device identifier and the secret, wherein the secret is subsequently validated, and the server computer obtains a second token based on the first token, and stores the second token, the user device identifier, and a second channel identifier, wherein the second token is associated with the credential, and wherein the first token enables the user to conduct a first interaction with using the first channel and the second token enables the user to conduct a second interaction using the second channel Another embodiment of the invention includes a user device comprising: a processor; and a computer readable medium, the processor comprising code executable by the processor, for performing operations comprising: transmitting, by a user device operated by a user to a server via a first channel, a user device identifier; transmitting, by the user device to the server via the first channel, a secret associated with the user, wherein the server stores a first token, the user device identifier, and a first channel identifier associated with the first channel, wherein the first token is associated a credential; and transmitting, by the user device to the server via a second channel, the user device identifier and the secret, wherein the secret is subsequently validated, and the server computer obtains a second token based on the first token, and stores the second token, the user device identifier, and a second channel identifier, wherein the second token is associated with the credential, and wherein the first token enables the user to conduct a first interaction with using the first channel and the second token enables the user to conduct a second interaction using the second channel.

These and other embodiments are described in further detail below.

TERMS

Figure 1:
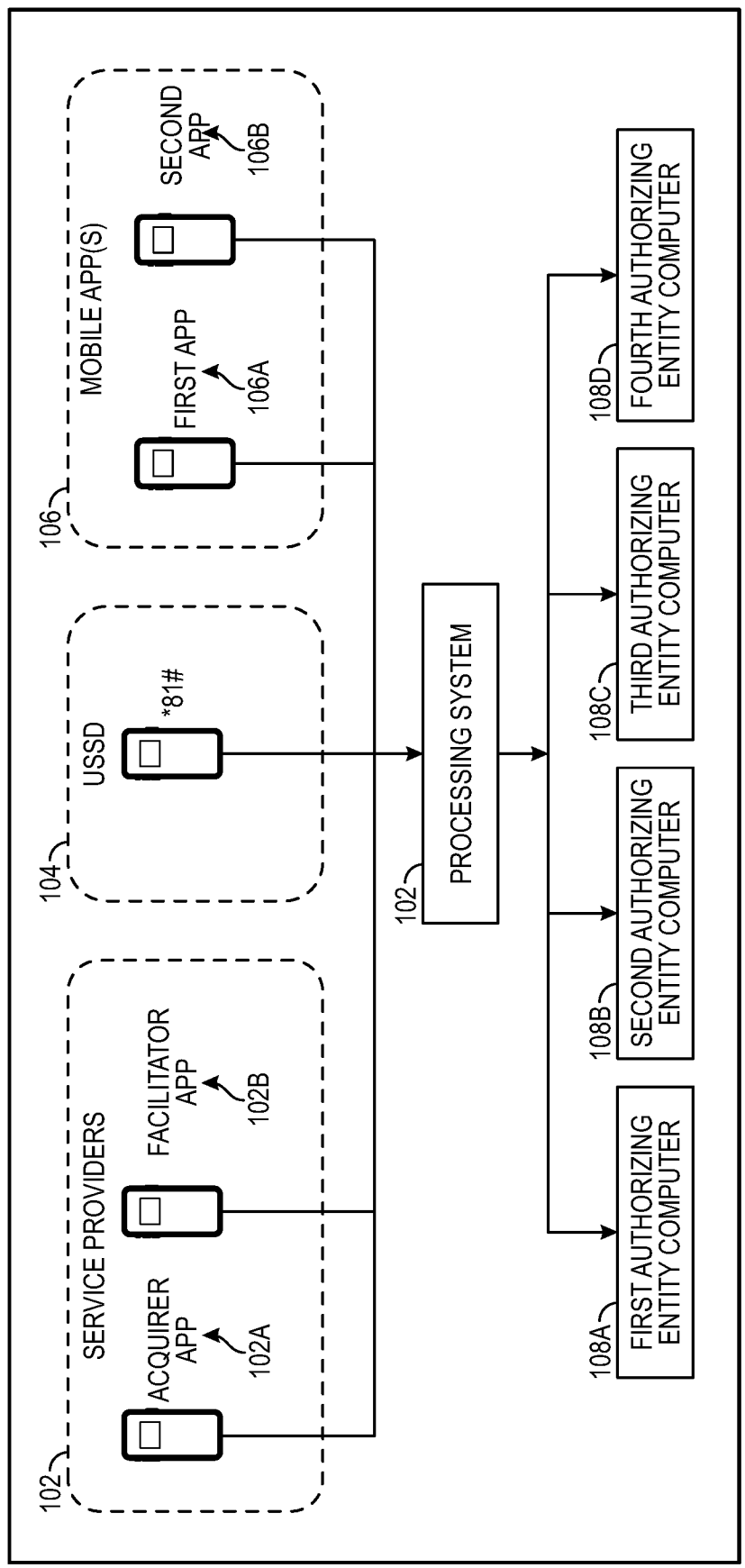
FIG. 1 shows a high level deployment architecture of a system according to an embodiment.

Prior to discussing specific embodiments of the invention, some terms may be described in detail.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment. An interaction can be a transfer of a resource from a first entity to a second entity.

A "user" may include an individual. In some embodiments, a user may be associated with one or more personal accounts and/or user devices.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin client device, a tablet PC, etc. Additionally, user devices may be any type of wearable technology device, such as a watch, earpiece, glasses, etc. The user device may include one or more processors capable of processing user input. The user device may also include one or more input sensors for receiving user input. There are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

A "token" may be a substitute value for a value such as a credential or routing identifier. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g., token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e., token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g., a 4-digit numeric value). In some embodiments, the token expiry date can be expressed as a time duration as measured from the time of issuance.

A "token request message" may be an electronic message for requesting a token. A token request message may include information usable for identifying a payment account or digital wallet, and/or information for generating a payment token. For example, a token request message may include payment credentials, mobile communication device identification information (e.g., a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g., a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "channel" can be an entry point for accessing someting. In some cases, a channel can be a service that provide access to credentials, or resources (e.g., goods and services, secure data, etc.). In another example, a channel can be a communication channel that allows access to something.

DETAILED DESCRIPTION

Embodiments of the disclosure include methods and systems that allow for the linking of a credential enrolled with a first channel to a second channel. When the credential is linked to the second channel, the user does not need to provide the credential to the second channel. Rather, the user can provide a secret to the second channel. The credential that was previously registered with the first channel can be automatically linked to the second channel, without transmitting the credential between channels. The credential is never exposed during this process and the number of steps that the user needs to perform to link the credential to the second channel is small. In addition, as will be apparent from the description below, the credential is protected during registration and interaction processes using routing identifiers and tokens.

FIG. 1 shows a high level architecture of a system according to an embodiment. The system can comprise a processing system 102 that can be integrated with a plurality of channels. A channel may be a medium through which a user initiates an interaction (e.g., payment transaction) involving the processing system 102. Examples of channels can include applications and their application servers such as those associated with service provider applications (e.g., acquirer app 102A, facilitator app 102B, USSD gateway 104) and communication applications (e.g., first mobile app 106A, second mobile app 106B)

USSD gateway 104 may be a channel that enables the user to initiate an interaction (e.g., transaction) involving the processing system 102. The USSD gateway 104 may be a central point at which several different protocols or communications signals are controlled and routed based upon several different parameters. USSD is a protocol used by GSM (Global System for Mobile Communication) cellular telephones to communicate with the service provider's computers. In some embodiments, USSD can be modified for use with mobile devices using the CDMA (Code Division Multiple Access) technology. USSD messages are typically up to 182 alphanumeric characters in length. Unlike Short Message Service (SMS) messages, USSD messages create a real-time connection during a USSD session. The connection remains open, allowing a two-way exchange of a sequence of data using menu based interface. This makes the USSD more responsive and user friendly than services that use only SMS messages. A typical USSD session begins by dialing an asterisk (*) followed by digits that comprise commands or data. Groups of digits may be separated by additional asterisks. The message is terminated with the number sign (#).

Service provider applications 101 and communication applications 106 may be mobile applications from which a user can initiate an interaction. For example, Acquirer App (or application) 102A may be an application that can be used by a resource provider such as a merchant to accept payments. In another example, Facilitator App (or application) 102B can be an application from which a user can conduct an e-commerce or point of sale transaction. In another example, First App 106A can be an application that enables the user to send messages and payments to a receiving user.

The processing system 102 may also be in operative communication with a plurality of authorizing entity computers 108A-D. The authorizing entity computers 108A-D may each associated with an issuer or entity (e.g., a bank) that holds accounts of users. Each of the authorizing entity computers 108A-D may determine whether or not to authorize interactions conducted by the users. Each of the authorizing entity computers 108A-D can receive, send, and analyze interaction messages such as authorization request messages and authorization response messages.

Authorizing entities may have previously provided mappings of users to account data to the processing system 102. For example, when a user opens an account with an authorizing entity, they may provide personal data such as a user device identifier (e.g., phone number, e-mail address, etc.) to the authorizing entity. The authorizing entity can provide this data to the processing system 102, which can then seed a directory of profiles mapping user device identifiers to associated accounts and credentials.

Messages between the devices in the Figures in this application can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network that may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

Figure 2A:
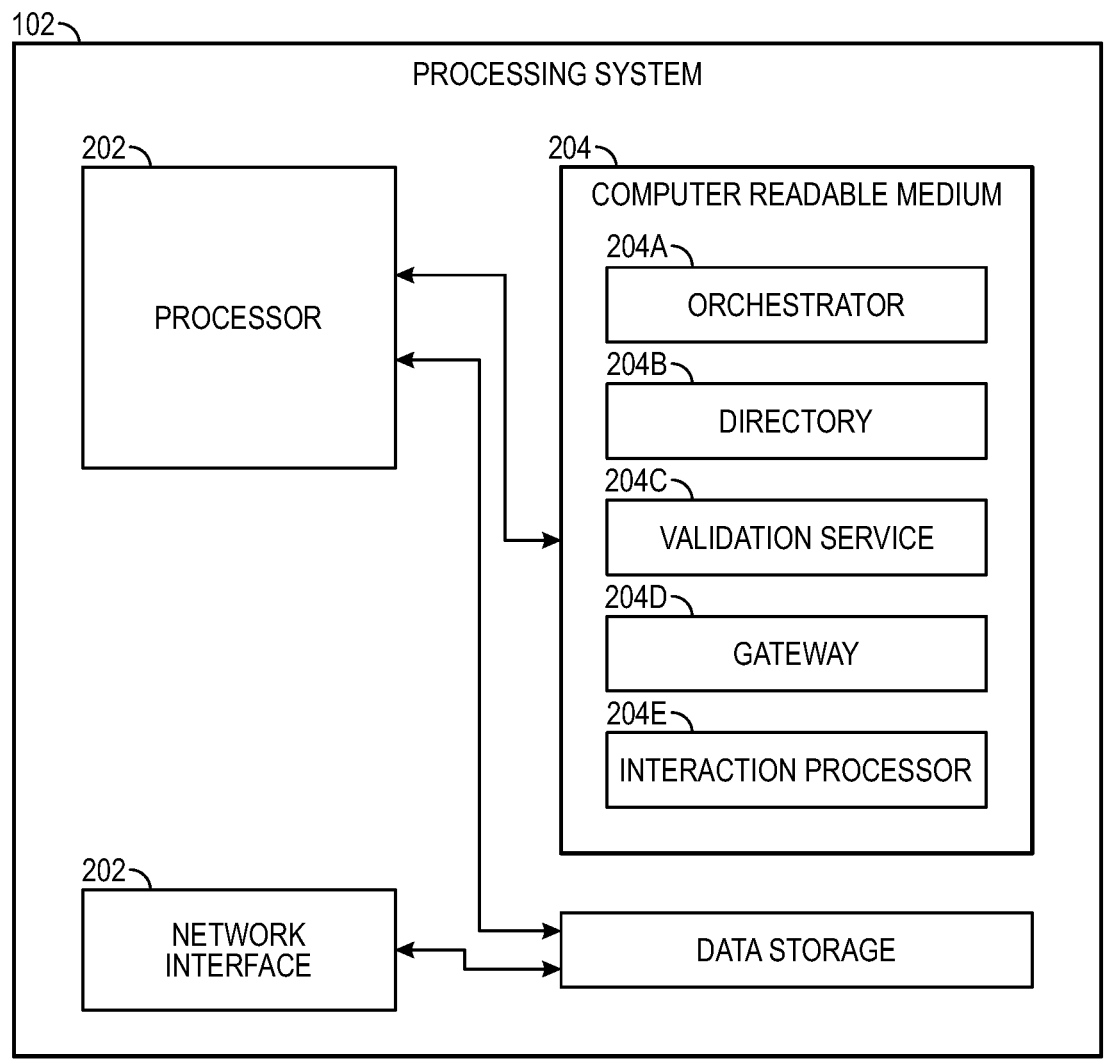
FIG. 2A shows a block diagram of a processing system according to embodiments.

FIG. 2A shows a block diagram of a processing system 102 according to embodiments. The processing system 102 can be configured to process interactions associated with users' accounts. The processing system 102 may comprise one or more processors 202, which may be coupled to one or more computer readable media 204, a data storage 206, and a network interface 208.

The data storage 206 can be used to store data and code. For example, the data storage 206 can store interaction data, channel identifiers, user device identifiers, secrets, enrollment statuses, velocity limits, tokens etc. It can also store addresses associated with authentication server computers, authorizing entity computers, and resource provider computers. The data storage 206 may be coupled to the processor 202 internally or externally (e.g., cloud based data storage), and may comprise any combination of volatile and/or non-volatile memory, such as RAM, DRAM, ROM, flash, or any other suitable memory device.

The computer readable medium 204 may comprise code executable by the processor 202 to perform operations comprising: receiving, from a user device operated by a user via a first channel, a user device identifier; receiving, from the user device via the first channel, a secret associated with the user; storing a first token, the user device identifier, and a first channel identifier associated with the first channel, wherein the first token is associated a credential; receiving, from the user device via a second channel, the user device identifier and the secret, wherein the secret is subsequently validated; after the secret is validated, obtaining a second token based on the first token; and storing the second token, the user device identifier, and a second channel identifier, wherein the second token is associated with the credential, wherein the first token enables the user to conduct a first interaction with using the first channel and the second token enables the user to conduct a second interaction using the second channel.

The computer readable medium 204 may comprise an orchestrator 204A, a directory 204B, a validation service 204C, a gateway 204D, and an interaction processor 204E. The orchestrator 204A may comprise code executable by the processor 202 to enable the processing system 102 to generate and transmit messages to and from a channel, initiate validation of a secret, and tokenize and retokenize credentials and other profile data. The directory 204B can comprise code executable by the processor 202 to enable the processing system 102 to maintain all user profiles. The profiles may comprise linkages of user device identifiers, credentials, and authorizing entities. The validation service 204C can comprise code executable by the processor 202 to enable the processing system 102 to validate secrets and authenticate the user. This can comprise receiving and responding to requests to check whether a user's secret is valid. The gateway 204D can comprise code executable by the processor 202 to enable the processing system 102 to send and receive messages. The interaction processor 204E can comprise code executable by the processor 202 to enable the processing system 102 to process interactions between various entities such as sending and receiving authorizing entity computers.

In embodiments of the invention, the orchestrator 204A, the directory 204B, the validation service 204C, the gateway 204D, and the interaction processor 204E can be software modules one or more computer readable media in a system. In other embodiments, they can be separate computers (e.g., server computers) that can operate independently from each other, but then together to implement embodiments of the invention. Each computer can have its own processor and computer readable medium, and the system may include the set of computers operating together to implement embodiments of the invention.

Figure 2B:
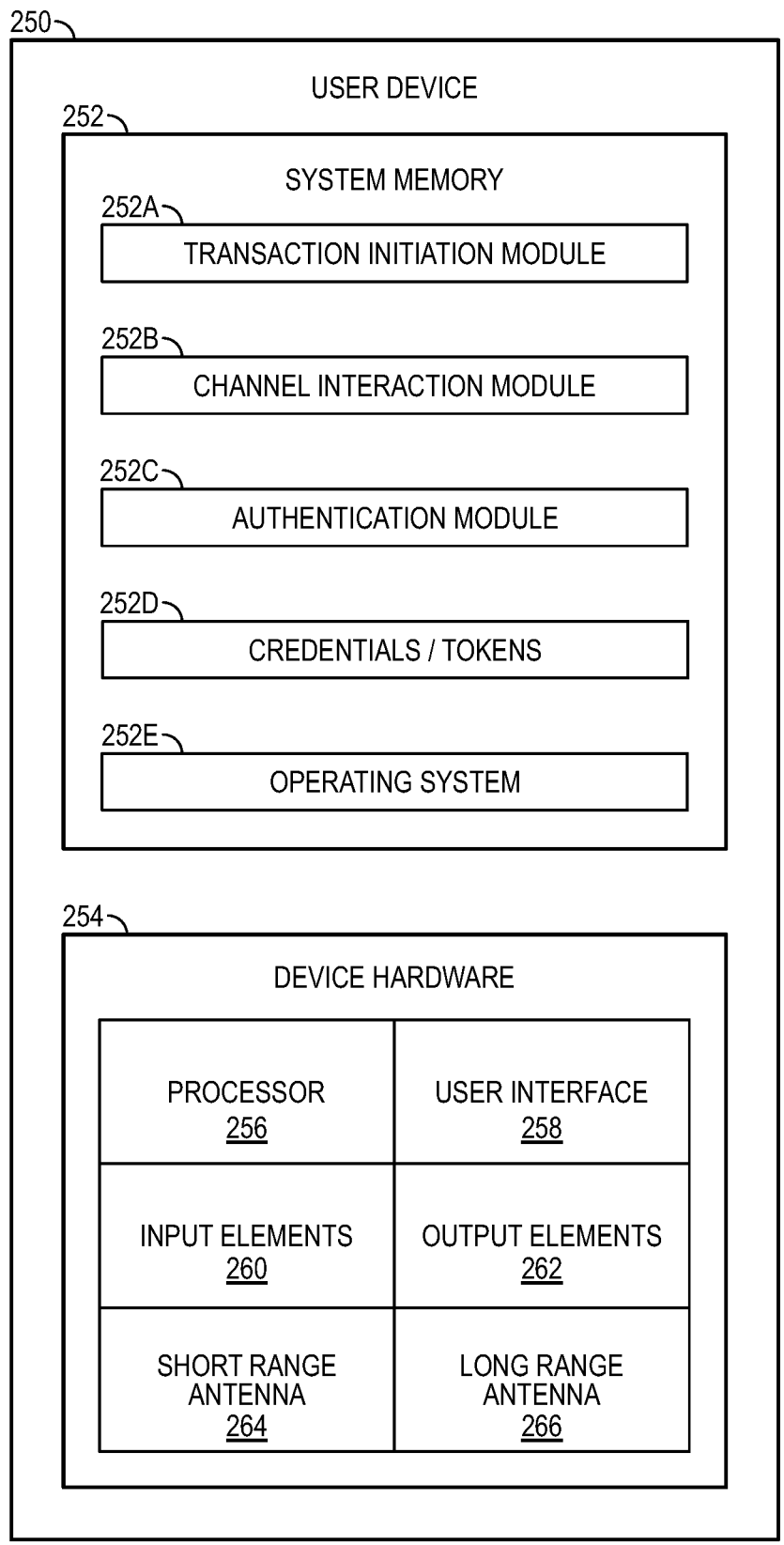
FIG. 2B shows a block diagram of a user device according to embodiments.

FIG. 2B illustrates a user device 250 according to an embodiment. User device 250 may include device hardware 254 coupled to a system memory 252.

Device hardware 254 may include a processor 256, a short range antenna 264, a long range antenna 266, input elements 260, a user interface 258, and output elements 262 (which may be part of the user interface 258). Examples of input elements may include microphones, keypads, touchscreens, sensors, etc. Examples of output elements may include speakers, display screens, and tactile devices. The processor 256 can be implemented as one or more integrated circuits (e.g., one or more single core or multicore microprocessors and/or microcontrollers), and is used to control the operation of user device 250. The processor 256 can execute a variety of programs in response to program code or computer-readable code stored in the system memory 252, and can maintain multiple concurrently executing programs or processes.

The long range antenna 266 may include one or more RF transceivers and/or connectors that can be used by user device 250 to communicate with other devices and/or to connect with external networks. The user interface 258 can include any combination of input and output elements to allow a user to interact with and invoke the functionalities of user device 250. The short range antenna 809 may be configured to communicate with external entities through a short range communication medium (e.g., using Bluetooth, Wi-Fi, infrared, NFC, etc.). The long range antenna 819 may be configured to communicate with a remote base station and a remote cellular or data network, over the air.

The system memory 252 can be implemented using any combination of any number of non-volatile memories (e.g., flash memory) and volatile memories (e.g., DRAM, SRAM), or any other non-transitory storage medium, or a combination thereof media.

The system memory 252 may also store a transaction initiation module 252A, a channel interaction module 252B, an authentication module 252C, credentials 252D, and an operating system 252E, The transaction initiation module 252A may include instructions or code initiating and conducting a transaction with an external device such as an access device or a processing system. It may include code, executable by the processor 256, for generating and transmitting authorization request messages, as well as receiving and forwarding authorization response messages. It may also include code, executable by the processor 256, for forming a local connection or otherwise interacting with an external access device. The channel interaction module 252B may comprise code, executable by the processor 256, for interacting with a channel. In some cases, the channel interaction module 252B can be in the form of an application such as a social networking application. The authentication module 252C may comprise code, executable by the processor 256, to authenticate a user. This can be performed using user secrets (e.g., passwords) or user biometrics.

System memory 252 may also store credentials and/or tokens 252D. Credentials may also include information identifying the user device 250 and/or the user of the user device 250. Examples of credentials may include a public key associated with the user device 250 and/or a user of the user device 250, a digital signature (e.g., the public key of the user device 250 signed by a key of the authentication system), payment credentials, biometric data (e.g., biometric samples or templates), etc.

Figure 3:
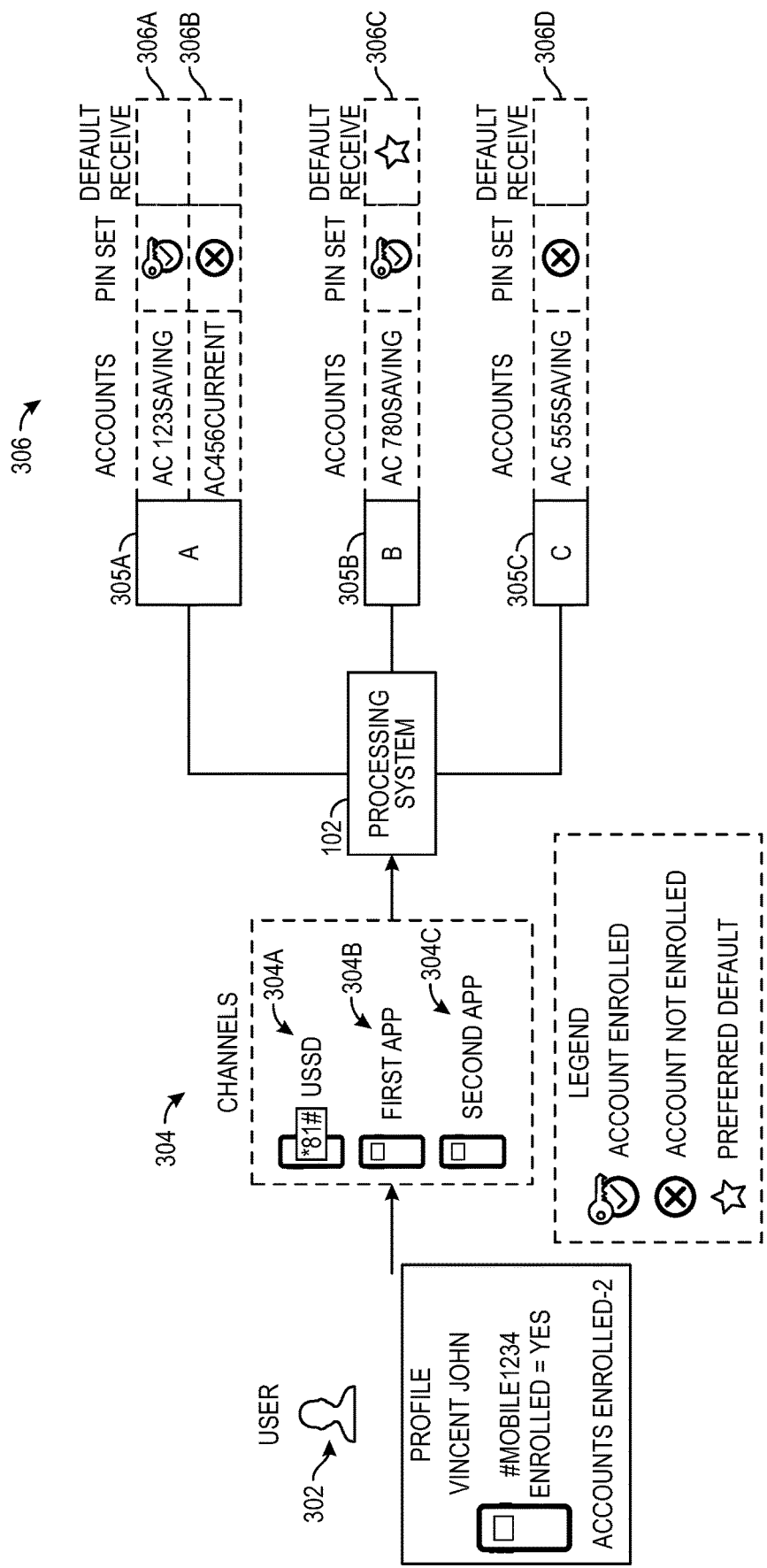
FIG. 3 shows a diagram illustrating how a single secret can be used with different channels to access multiple accounts maintained by different authorizing entities.

The system memory 252 can comprise a computer readable medium comprising code, executable by the processor 256 to perform operations comprising: transmitting, by a user device operated by a user to a server via a first channel, a user device identifier; transmitting, by the user device to the server via the first channel, a secret associated with the user, wherein the server stores a first token, the user device identifier, and a first channel identifier associated with the first channel, wherein the first token is associated a credential; and transmitting, by the user device to the server via a second channel, the user device identifier and the secret, wherein the secret is subsequently validated, and the server computer obtains a second token based on the first token, and stores the second token, the user device identifier, and a second channel identifier, wherein the second token is associated with the credential, and wherein the first token enables the user to conduct a first interaction with using the first channel and the second token enables the user to conduct a second interaction using the second channel FIG. 3 shows a diagram illustrating how a single secret can be used with different channels to access multiple accounts maintained by different authorizing entities.

The user 302 may have a plurality of accounts that are maintained by a plurality of authorizing entities. As shown in FIG. 3, user 302 may have savings account 306A and current account 306B (e.g., a checking account) with first authorizing entity A 305A, savings account 306C with second authorizing entity B 305B, and savings account 306D with third authorizing entity C 305C. Savings account 306A and savings account 306C can be enrolled accounts. As such, savings account 306A and savings account 306C may be accessed via the enrolled channels.

The user 302 may operate a user device with a unique user device identifier (e.g., a phone number). Embodiments can use the user device identifier as a reference to the profile of the user 302, and maintain the profile in a storage database such as the directory of processing system 102. The profile is created when the user 302 initially enrolls in the system and sets up a secret. The profile can comprise the user device identifier, the name of the user, the credential(s) of the enrolled account(s), the name(s) of the authorizing entity or authorizing entities that maintain the one or more enrolled accounts of the user, and the secret used to access the profile.

The user 302 can enroll via any of the channels 304. During enrollment, the user 302 can set up a secret for the profile. The user 302 can then use the same secret to initiate an interaction using any of the channels 304 that they enroll in. The secret can also be used as a form of authentication before enrolling an account from a new channel. For example, during initial profile enrollment the user 302 may enroll savings account 306A via USSD 304A and set up a secret. At a later time, the user 302 may wish to access their profile via a new channel such as First App 304B. In order to access their profile from First App 304B, the user 302 may be required to provide the secret.

In some embodiments, when the profile is created, the user 302 can select one of their accounts maintained by an authorizing entity to become the default account. The default account can be the account which interactions are credited to and from unless otherwise specified.

Embodiments can issue tokens to enable each enrolled account to be linked to each enrolled channel. Each enrolled channel can have one token for each enrolled account. For example, a profile with three enrolled channels 304 may each have two linked accounts 306, for a total of six tokens.

In some embodiments, if the user 302 changes the accounts which are linked to their profile using a first channel, then the other enrolled channels can be automatically updated. For example, the user 302 may have three enrolled channels: USSD 304A, First App 304B, and Second App 304C. The user 302 may use First App 304B to link a new account. When embodiments issue a token to enable the new account to be linked to First App 304B, embodiments can automatically issue tokens to enable the other channels (USSD 304A and Second App 304C) to be linked to the new account.

Figure 4:
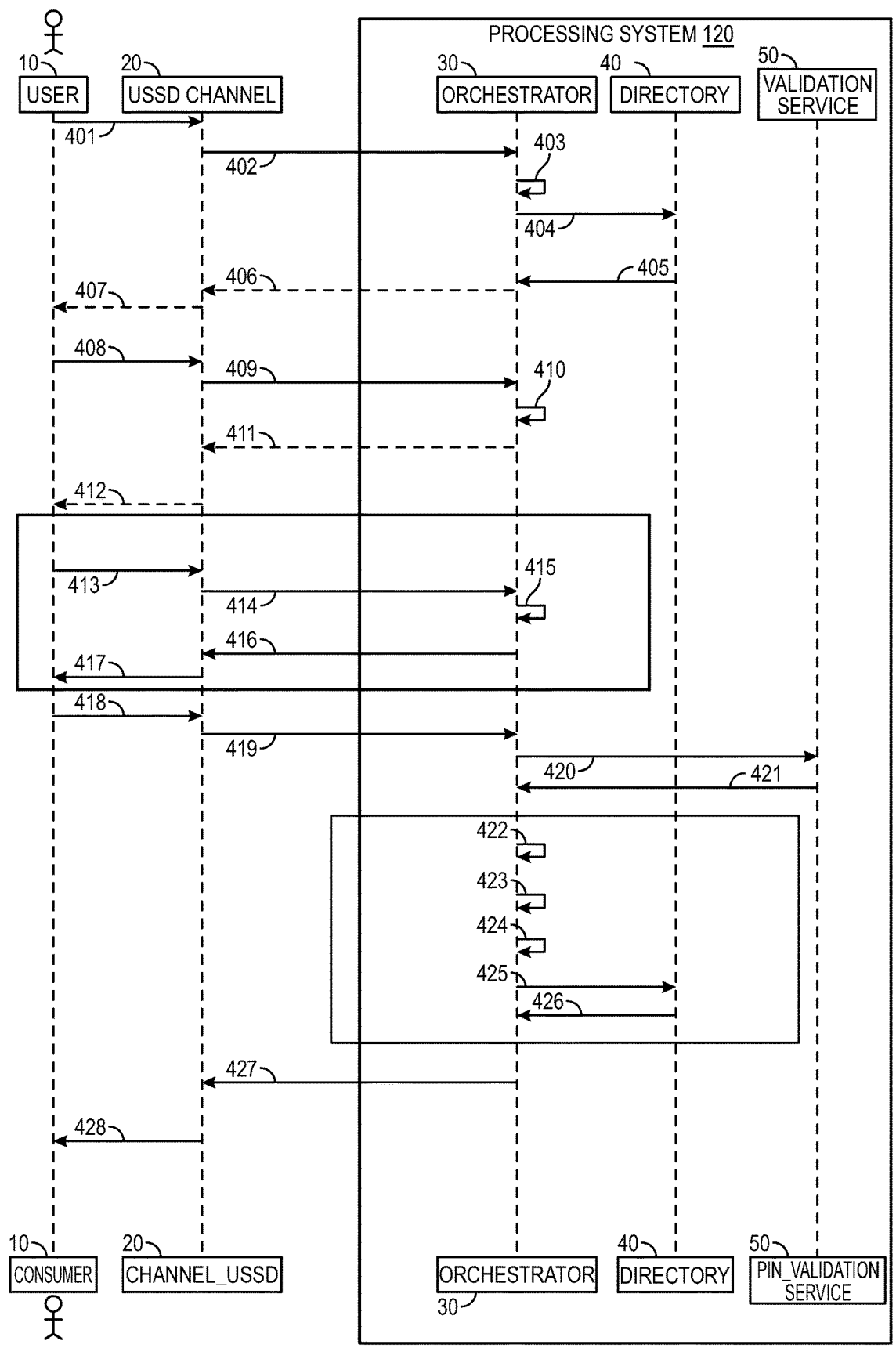
FIG. 4 shows a flow diagram of a user initially enrolling in the system via a first channel.

FIG. 4. shows a flow diagram of a user initially enrolling in the processing system 102 via a first channel. FIG. 4 shows a user 10 (e.g., a consumer) that operates a user device. The user 10 interacts with a channel such as a USSD channel 20. The USSD channel 20 can be in operative communication with a processing system 120 comprising an orchestrator 30, directory 40, and validation service 50. As noted above, the orchestrator 30, the directory 40, and the validation service 50 can be embodied by software modules, or they may be separate computers that can operate independently of each other, but together to implement embodiments of the invention.

Figure 5:
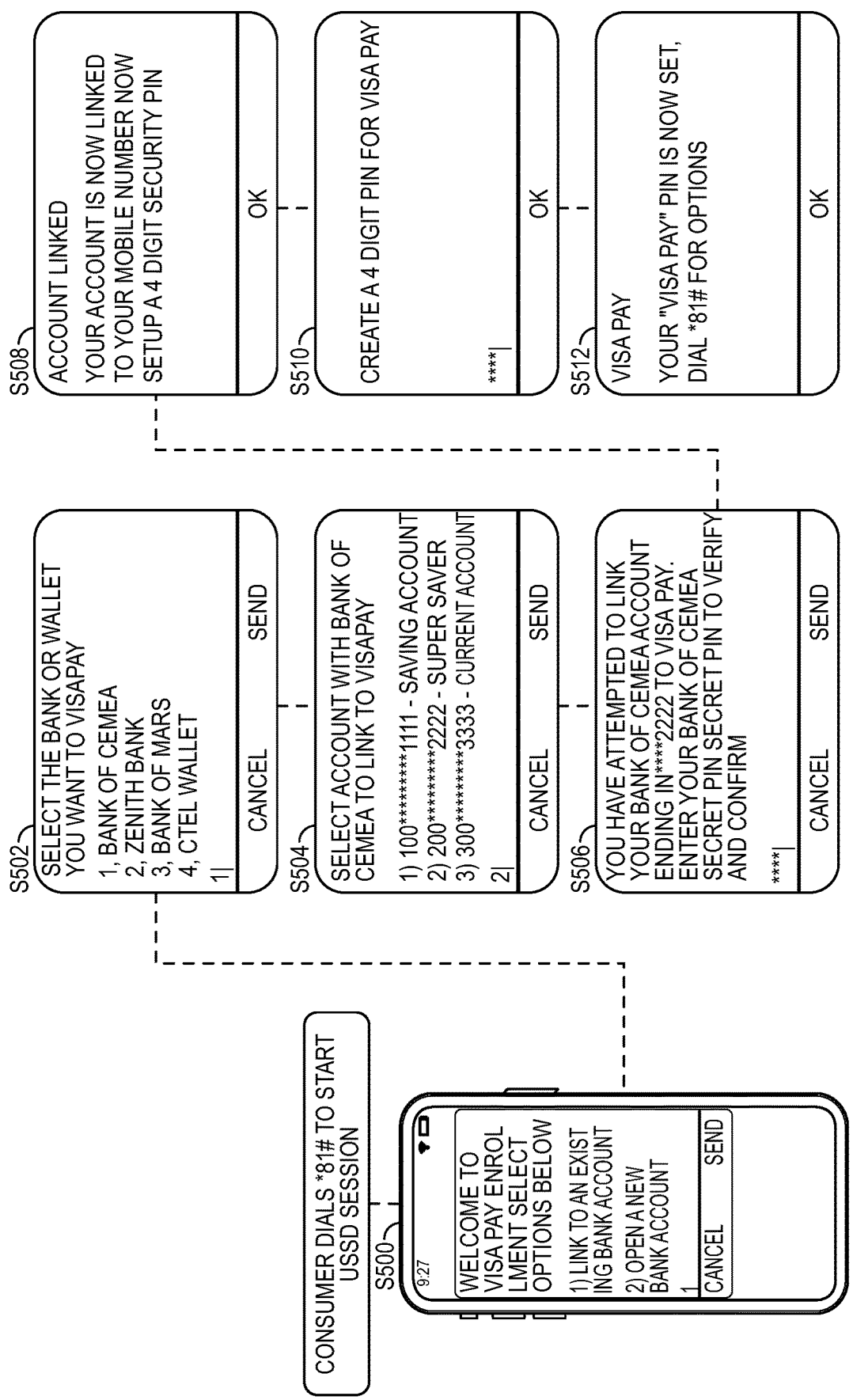
FIG. 5 shows an exemplary flow of an initial enrollment using a USSD channel.

FIG. 5 shows an exemplary user interface flow corresponding to some of the steps described in FIG. 4, wherein the user device is a mobile phone and the channel is a USSD channel 20. The USSD channel 20 could be another type of channel in other embodiments of the invention.

In step 401, the user 10 can initiate an interaction using USSD channel 20. In some embodiments, the user 10 can input a user device identifier (e.g., a phone number) to the USSD channel 20 to initiate the interaction. In some embodiments, the user 10 does not need to input the user device identifier.

For example, if the channel is a USSD channel, in order to initiate the interaction, the user 10 may operate a user device and dial *#81*, as shown in S500 of FIG. 5. The user 10 does not need to input a user device identifier to initiate the interaction.

Referring back to FIG. 4, in step 402, the USSD channel 20 can receive the interaction request message from the user 10 and transmit a message to the orchestrator 30 comprising the user device identifier. The status request can be a request to determine whether or not the user 10 has an existing profile and secret.

In step 403, the orchestrator 30 can determine that the user 10 does not have an existing profile and secret. For example, the orchestrator 30 can search a database to determine there is not an existing profile associated with the user device identifier, which can indicate that the user 10 has not previously enrolled in the system. Once it has been determined that the user 10 does not have an existing profile and secret, the processing system can begin to execute steps for initial enrollment.

In step 404, the orchestrator 30 can retrieve a list of accounts from directory 40. The list of accounts can comprise data associated with one or more accounts associated with the user device identifier.

The directory 40 can comprise a database comprising user identifiers (e.g., phone numbers) for users and any information associated with credentials. For example, the information associated with the credentials can be the credentials themselves (e.g., account numbers), routing identifiers associated with the credentials and/or alias information associated with the credentials (e.g., "ABC bank credit card number ending in 3287"). Information in the directory may have been previously sent to the directory by various authorizing entity computers associated with authorizing entities. The users may have provided those authorizing entities with user device identifiers associated with their accounts at the authorizing entities.

In step 405, the directory 40 can return the account data associated with the list of accounts associated with the user identifier to the orchestrator 30. In some embodiments, the account data associated with the list of accounts can comprise, for each account associated with the user device identifier, an authorizing entity name, a routing identifier, a username, and an account identifier (or alias of the account identifier). The alias of an account identifier (e.g., "credit card ending in 4000") can be an example of a credential identifier. The routing identifier can be a number in the form of a primary account number (PAN), which is linked to an underlying account (e.g., a demand account such as a checking account, a credit card account, a debit card account, etc.). The routing identifier can be referred to as a routing PAN in some embodiments. The routing identifier can be used by the processing system 102 to represent the credential associated with an underlying account during processing. Because of this, the credential is protected. The credential need not be transmitted or received in a transmission by the processing system 102 to conduct an interaction using an account associated with the credential. Further, the routing identifier can be in a format such as an ISO 8583 format, and processing can be performed using authorization request and response type messages typically used in credit and debit card transactions. As such, in embodiments of the invention, a credit and debit card processing system can advantageously process transactions involving accounts such as checking or savings accounts using the routing identifiers.

In some embodiments, the routing identifier and token associated with the routing identifier can have the same number of characters or digits. In some embodiments, the credential, routing identifier, and the token can have the same number of characters or digits.

In steps 406 and 407, the orchestrator 30 can provide the list of account data to the user 10 via the USSD channel 20.

In step 408, after receiving the list of account data from the orchestrator 30, the user 10 can select an account to link to the system. The user 10 may select the account with which they wish to use for a future interaction. For example, the user 10 may receive a list of bank accounts that they have open. The user can select the bank account that they wish to send and receive money from using USSD channel 20.

As an example, S502 of FIG. 5 shows a list of authorizing entities that the user has registered accounts with. The user can input "1" to choose Authorizing Entity A, which maintains the account they wish to link. In S504, the USSD channel 20 may display to the user a list of their accounts maintained by Authorizing Entity A, and the user can select to link the account titled "Super Saver" by inputting "2."

In some embodiments, once the user 10 selects the account that they wish to link, the user 10 must authenticate themselves to ensure that the person initiating the interaction is the genuine account holder. The user 10 can receive an authentication request message and may be required to provide an authentication input to the USSD channel 20. The USSD channel 20 can transmit an authentication response message to the orchestrator 30, and the orchestrator 30 can determine whether or not the user is authenticated. Various authentication methods can be used. Exemplary authentication methods or CVM (cardholder verification methods) can include, for example, one time password authentication methods, biometric verification methods, PIN or password authentication processes, etc. In embodiments of the invention, the orchestrator 30 can request authentication data from the user 10, and then can receive the authentication data from the user 10.

Referring back to FIG. 4, in step 409, after receiving the account selection from the user 10, the USSD channel 20 sends a request to the orchestrator 30 for the CVM (cardholder verification method) or CVM options supported by the selected account.

In step 410, the orchestrator 30 can determine the one or more CVM options supported by the selected account. In some embodiments, the authorizing entity associated with the account can determine which CVM options are supported. For example, the authorizing entity can determine that the supported CVM method is an expiration date.

In step 411, the orchestrator 30 can transmit to the USSD channel 20 the one or more supported CVM options, and in step 412 the USSD channel 20 can present the one or more CVM options to the user 10.

In steps 413-416, a CVM flow is performed where the user 10 is verified by orchestrator 30 (e.g., via a PIN, password, biometric, one time password (OTP), etc.) The user can select a CVM option, and the user can be authenticated using the selected CVM option. Messages are passed between the orchestrator 30, the user 10, and the USSD channel 20 to perform the authentication of the user. In some embodiments, an authorizing entity (e.g., an issuer) can perform authentication of the user in addition to or instead of the orchestrator 30.

S506 of FIG. 5 illustrates one example of CVM that may be used. The USSD channel prompts the user to provide a PIN associated with the "Super Saver" account that they selected to link. The PIN may be a PIN that was set up by the user when they opened the account with Authorizing Entity A.

Referring back to FIG. 4, in step 417, the user 10 can receive a message from the USSD channel 20 indicating that the authentication and linking process with the selected account is complete. The message may further prompt the user 10 to set up a secret.

In step 418, the user 10 can transmit a secret to the USSD channel 20. For example, the user 10 can determine a secret, input the secret to their user device, and send it to the USSD channel 20. The secret could be, for example, a PIN, password, or biometric.

S508 of FIG. 5 illustrates an example confirmation message that may be shown to the user to indicate that the authentication and linking process with the selected account is complete. In S510, the user sets up a secret as described in step 418 of FIG. 4.

Referring back to FIG. 4, in step 419, the USSD channel 20 passes the chosen secret to orchestrator 30.

In step 420, the orchestrator 30 can transmit a message to the validation service 50 to set the secret. In some embodiments, the secret may be encrypted.

In step 421, the validation service 50 sends a response to the orchestrator 30 indicating that the secret has been received by the validation service 50.

In step 422, the orchestrator 30 then tokenizes the routing identifier to form a token. The token can be mathematically derived from the routing identifier or can be retrieved from a pool of tokens associated with the routing identifier. The routing identifier and the token can have the same format (e.g., 16 digits of numbers).

In step 423, the orchestrator 30 can set conditions such as velocity limits (e.g., not more than 10 transactions per day can be conducted with the token) for the created token. In some embodiments, each account that the user 10 enrolls may have an interaction limit to restrict exposure to fraud and reduce risk. Some limits may be channel specific to reduce user exposure in the event that the channel is compromised.

In step 424, the orchestrator 30 stores the user device identifier, a channel indicator for USSD channel 20, the token, and the routing identifier in a database.

In steps 425-426, the orchestrator 30 sets the token as a default in the directory 40 and can receive a response from the directory 40. The token can be the default token to be used when the user uses the user device identifier with the channel to conduct an interaction.

In steps 427-428, various responses are provided.

As shown in S512 of FIG. 5, the user may receive a confirmation message to indicate that the enrollment process is complete. The processing system 102 can establish a user profile which includes in a database, the following information for each account: a user device identifier (e.g., a phone number) associated with the account; a user name; an authorizing entity name (e.g, a bank name), a credential alias (e.g., "account ending in 1234"), the actual credential (e.g., a bank account number), a routing identifier (e.g., a routing PAN), a secret (e.g., masked or in the clear), a default channel indicator (e.g., "Fintech A"), information about transactions supported (e.g., sending and receiving funds), and a trusted recovery phone number. Information in the profile not previously discussed can be requested from the user.

The user 10 can now initiate interactions using USSD channel 20 and the user's user device identifier. For example, the user 10 can conduct a payment transaction to pay a receiver a predetermined amount of money by using only the user device identifier and the receiver device identifier in the USSD channel 20.

In some embodiments, the user may wish to access one or more of their accounts using a second channel. For example, the user may have completed an initial enrollment process (as described in FIG. 4) from a USSD channel, but may also wish to use a mobile application to initiate an interaction. Embodiments can allow the user to initiate an interaction from a second channel without having to set up a secret. The user can access the linked account that they selected (see step 408 of FIG. 4) via the second channel using the same secret (see step 418 of FIG. 4).

Figure 6:
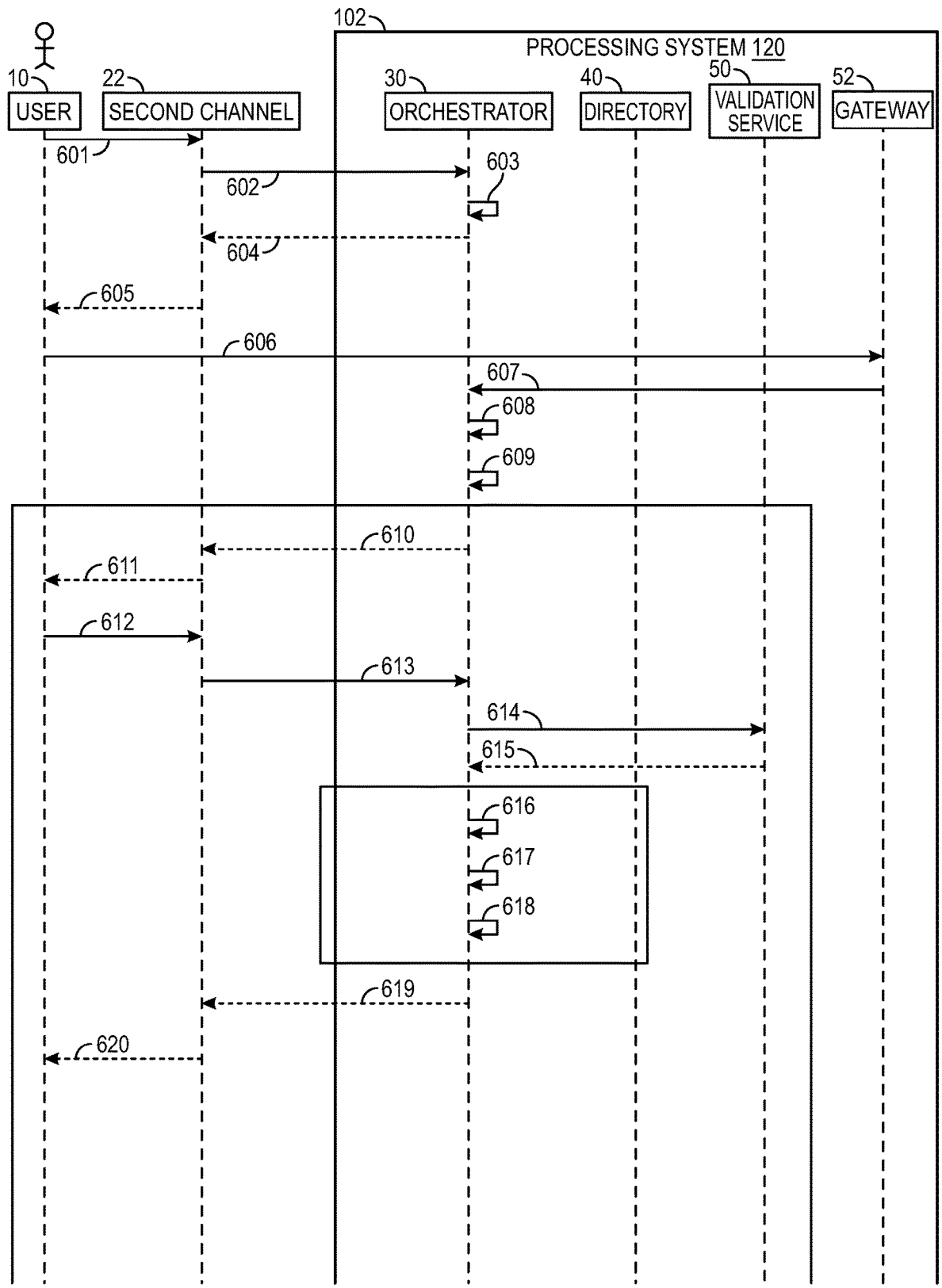
FIG. 6 shows a flow diagram showing a user subsequently enrolling in the system via a second financial channel.

FIG. 6 shows a flow diagram showing a user subsequently enrolling in the system via a second financial channel. FIG. 6 shows a user 10 (e.g., a consumer) that operates a user device. The user 10 interacts with a second channel 22 such as a mobile application. The mobile application channel can be supported by an application server. The mobile application could be a social networking application such as WeChat™ and can be supported by a WeChat™ application server. The second channel 22 can be in communication with the processing system 102. Like FIG. 4, the processing system 120 comprises an orchestrator 30, a directory 40, and a validation service 50. It can also comprise a gateway 52. The gateway 52 can be an SMS gateway or other communication gateway.

In the embodiments of FIG. 6, the user can enroll the same account that was enrolled with the USSD channel 20 in FIG. 4 with the second channel 22 in FIG. 6 by only supplying the previously enrolled secret. The user 10 does not need to enter credential information with the second channel 22.

In step 601, the user 10 begins enrollment with a second channel 22 (e.g., a mobile application and its associated computers and software).

In step 602, after the user 10 begins enrollment with the second channel 22, the second channel 22 can notify the orchestrator 30 that the user 10 is requesting to enroll.

Before proceeding with enrollment, embodiments can determine whether or not the user 10 has previously enrolled by checking if the user device identifier is associated with an existing profile. Embodiments can obtain the user device identifier from the user 10 by transmission of an authentication string (e.g., a one-time code or a cryptographically signed short lived session identifier) to the user 10.

In step 603-605, after receiving the enrollment request made by the user 10, the orchestrator 30 can generate an authentication string and transmit it to the user 10 via the second channel 22. In some embodiments, the authentication string may be a one-time code or a cryptographically signed short lived session identifier.

In steps 606 and 607, after the user 10 receives the authentication string, the user 10 can provide to the orchestrator 30 the user device identifier. For example, user can transmit an SMS with the authentication string to the orchestrator 30 via the gateway 52.

In step 608, the orchestrator 30 can receive the SMS and verify the authentication string in the SMS matches the authentication string it generated.

In step 609, after the orchestrator 30 validates the authentication string, it can extract the user device identifier from the SMS. For example, if the user device identifier is the mobile number of user 10, the orchestrator 30 can check the number from which the SMS was sent. The orchestrator 30 can determine that the user device identifier is already associated with an existing profile, which indicates that the user 10 has previously set up the secret.

In steps 610 and 611, the orchestrator 30 transmits a request for the previously provided secret (e.g., PIN) to the user 10 via the second channel 22. The previously provided secret was the one that was set up in step 418 of FIG. 4.

In steps 612 and 613, the user 10 transmits the secret (e.g., PIN) to the orchestrator 30 via the second channel 22.

In step 614, the orchestrator 30 communicates the received secret and the user device identifier to the validation service 50 to validate it.

In step 615, the validation service 50 can search a database to determine if the secret provided by the user 10 matches the secret associated with the account, which was previously provided. If the secret is a match, the validation service 50 can return a message indicating that the secret is validated to the orchestrator 30.

In step 616, upon validation of the secret, the orchestrator 30 retokenizes the existing token associated with the user device identifier of the user 10 that was created in the flow described in FIG. 4. In some embodiments, the orchestrator 30 can request the routing identifier from the directory 40 using the token, and the orchestrator 30 can tokenize the routing identifier to a second token that is different than the existing first token from FIG. 4.

In some embodiments, there may be more than one existing token associated with the user device identifier. For example, the user 10 may have previously linked three accounts via a first channel, thereby creating three tokens associated with the user device identifier. When the user 10 enrolls in a second channel, all three of the existing tokens can be retokenized. In total, the user device identifier may be associated with six tokens.

In step 617, velocity limits are set up by the orchestrator 30 for the newly created second token.

In step 618, the orchestrator 30 stores a mapping of the user device identifier, a second channel indicator for second channel 22, and the second token.

In step 619-620, various notification messages can be sent to the second channel 22, the user 10, and the directory 40.

Figure 7:
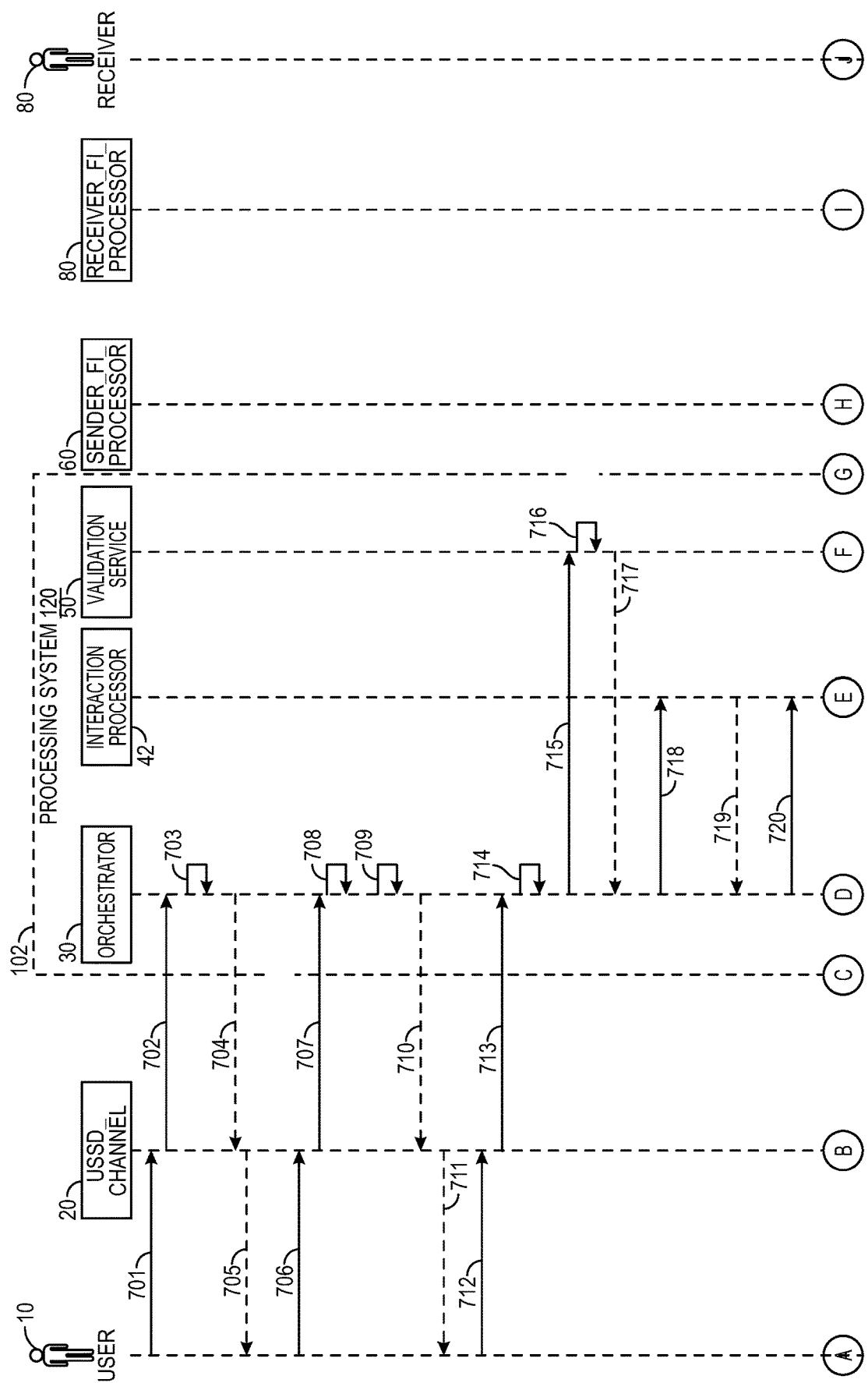
FIG. 7 shows a flow diagram illustrating a transfer of value from a user to a receiving user using the system.

FIG. 7 shows a flow diagram illustrating an interaction between a user 10 that is a sender and a user that is a receiver 80 using the system, after the user 10 and the receiver 80 have both enrolled in the system. FIG. 7 shows a user 10 that operates a user device. The user 10 interacts with a USSD channel 20 (e.g., a first channel such as the one described in FIG. 4). The USSD channel 20 can be implemented with a communication computer. The USSD channel 20 can be in communication with the processing system 102, which may comprise an interaction processor 42 and a validation service 50. The interaction processor 42 can also be in communication with a sender processor 60 and a receiver processor 70. A receiver 80 operating a receiver user device can be in communication with the receiver processor 70. The interaction processor 42 can be a processing network such as a payment processing network, which can perform authorization and clearing and settlement services. An example of an interaction processor 42 is VisaNet™.

In step 701, the user 10 may wish to initiate an interaction with a receiver 80, and can start a session with the USSD channel 20. For example, the user 10 may wish to send a payment to receiver 80. The user 10 can dial *#81* to start a session with USSD channel 20 and transmit the user device identifier.

In steps 702-704, the USSD channel 20 communicates with the orchestrator 30 to determine if the user 10 is enrolled. The USSD channel 20 can transmit to the orchestrator 30 the user device identifier received from the user 10 in step 701. The orchestrator 30 can check the user's profile using the user device identifier and determine whether or not the user 10 has previously enrolled in the system.

In step 705, the USSD channel 20 presents a main menu to the user 10. For example, the USSD channel 20 may present to the user 10 the option to send a payment.

In step 706, the user 10 can select an option to initiate an interaction with the receiver 80 by entering a receiver user device identifier (e.g., the receiver's phone number) and transmitting it to the USSD channel 20. The user 10 may also submit interaction details such as a transaction amount. If the user 10 has enabled multiple accounts with the USSD channel 20, then the user 10 can select which account to use for the interaction.

In step 707, the USSD channel 20 can send a request to the orchestrator to check whether or not the receiver user 80 has previously enrolled. The USSD channel 20 can send the user device identifier and the receiving user device identifier to the orchestrator 30. The USSD channel 20 may also transmit interaction details such as a transaction amount to the orchestrator 30.

In step 708, after receiving the request from the USSD channel 20, the orchestrator 30 can check whether or not the receiver user 80 has previously enrolled. In this embodiment, the receiver user 80 has previously enrolled and the orchestrator 30 can determine that the receiving user device identifier is associated with a secret and at least one token. The orchestrator 30 can retrieve details associated with the receiver user device identifier such as a name of the receiver 80 and a name of the authorizing entity associated with the receiving user's account.

In step 709, the orchestrator 30 calculates an interaction fee.

In steps 710-711, the details associated with the receiver user device identifier and the interaction fee are sent to the user 10 via the USSD channel 20. For example, the user 10 can receive the name of the receiver 80 and the authorizing entity of the receiving user's account.

In step 712, after receiving the details associated with the receiving user device the user 10 can confirm the interaction. The user can enter the secret that was created during initial enrollment (see FIG. 4). This information is sent to the USSD channel 20.

In step 713, after receiving the secret from the user 10 the USSD channel 20 sends the user device identifier, the receiver user device identifier, the interaction details and the secret to the orchestrator 30.

In step 714, the orchestrator 30 performs velocity and risk checks.

In step 715, the orchestrator 30 sends the secret to the validation service 50.

In step 716, after receiving the secret from the orchestrator, the validation service 50 can determine if it matches the secret that was created during initial enrollment. If the validation service 50 validates the secret, it can then generate a cryptogram such as a CAVV (card authentication verification value).

In step 717, the validation service 50 can transmit the CAVV cryptogram to the orchestrator 30.

In steps 718-719, the orchestrator 30 sends the routing identifier (e.g., a routing PAN) and the CAVV to the interaction processor 42, and then receives a token cryptogram (e.g., a TAVV or token authentication verification value) from the interaction processor 42.

In step 720, the orchestrator 30 initiates a pull funds request such as an AFT (account funding transaction) message comprising the token, the CAVV, and the TAVV, and sends it to the interaction processor 42 via an API (e.g., an AFT API).

In step 721, the interaction processor 42 then de-tokenizes the token to obtain the routing identifier, and can also validate the CAVV and the TAVV. These values may be decrypted or verified cryptographically to verify them.

In step 722, the interaction processor 42 transmits an AFT message with the routing identifier and the transaction amount to the sender processor 60. The sender processor 60 can be a sender authorizing entity computer such as a sender bank computer.

An AFT (Account Funding Transaction) is a transaction designed to supply funds to another account such as a credit, prepaid, debit, ATM or on-line account. In some embodiments, the AFT message can be used to pay a service provider for sending funds to the recipient and results in a debit to the sender's account. The amount of the debit can be the amount of the credit to be delivered to the recipient plus any fees being charged by the service provider such as a transfer fee, or a currency conversion fee (if applicable).

An AFT indicator can be used in both the authorization and clearing and settlement transactions and is preceded by an authorization. Settlement can take place within two working days, or more or less than this. Neither the authorization nor the clearing transaction carries any financial information about the recipient of a money transfer. In some embodiments, the AFT carries the account number or other identifier associated with the payment account of the sender. An AFT message can also be accompanied by indicators, which allow the sender's issuer to take appropriate authorization decisions. Indicators include channel information such as Mail Order/Telephone Order or Internet, etc.

In step 723, the sender processor 60 then makes adjustments to the account of the user 10. For example, the sender processor 60 can move money associated with the AFT out of the user's account to a separate account, which can be an escrow account.

In steps 724-725, a success message is sent from the sender processor 60 to the interaction processor 42, and then to the orchestrator 30.

In step 726, the orchestrator 30 can fetch the token associated with the receiving user device identifier, or the token associated with the receiving user's account.

In step 727, an OCT (original credit transaction) message can be initiated by the orchestrator 30 by sending the token of the receiving user's account and the interaction details to the interaction processor 42.

An OCT (Original Credit Transaction) is typically a clearing and settlement credit transaction designed for use in business applications such as a business money transfer or business-to-consumer repayments. In embodiments of the invention, the OCT can be used to deliver funds to the recipient account. It can be separate from, and can take place after, the AFT transaction. This timing can ensure that payment funds are secured before funds are sent to the recipient.

The amount of the OCT can be the amount agreed to by the sender and the service provider in the currency agreed. The OCT can carry the account number of the recipient and no information about the sender. A special indicator can identify an OCT to the recipient's issuer bank. Settlement can take place within two days, or more or less time than this.

In step 728, the interaction processor 42 detokenizes the receiver's token to obtain the routing identifier of the receiving user's account.

In step 729, the interaction processor 42 sends the OCT message including the routing identifier and the appropriate amount to credit the receiver's account to the receiver processor 70. The receiver processor 70 can be a receiver authorizing entity computer such as a receiver bank computer.

In step 730, after receiving the OCT message, the receiver processor 70 credits the receiver's account.

In step 731, an OCT response message is sent from the receiver processor 70 to the interaction processor 42.

In steps 732-735, interaction confirmations are sent to the receiver 80 and the user 10.

At the end of the day or another period of time, the actual movement of founds between the accounts held by the sender processor 60 and the receiver processor 70 can take place.

FIG. 7 shows one exemplary interaction process flow according to embodiments. Other interaction processes (e.g., reversal transactions, dual message authorization processes, etc.) that involve the use of a user device identifier can be performed.

Embodiments of the invention have a number of advantages. In embodiments, a single secret (e.g., a PIN, biometric, etc.) of the user can be used to create new tokens for the same or different accounts accessed through various channels. The user does not need to set up a new secret each time they enroll a new channel. Further, user to user transfers can be conducted seamlessly using the single secret and a user device.

Further, as illustrated by the above process flows, embodiments of the invention can be conducted by users by using only a user device identifier. The underlying credentials (e.g., account numbers) associated with the accounts used in the transaction reside security at the authorizing entity computers of the users, and are not transmitted or processed by any other entities. As such, the underlying credentials are protected from hackers and man-in-the-middle attacks.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server from a user device operated by a user via a first channel, a user device identifier;
   receiving, by the server from the user device via the first channel, a secret associated with the user;
   storing, by the server, a first token, the user device identifier, and a first channel identifier associated with the first channel, wherein the first token is associated a credential;
   receiving, by the server from the user device via a second channel, the user device identifier and the secret, wherein the secret is subsequently validated;
   after the secret is validated, obtaining, by the server, a second token based on the first token; and
   storing, by the server, the second token, the user device identifier, and a second channel identifier, wherein the second token is associated with the credential,
   wherein the first token enables the user to conduct a first interaction using the first channel and the second token enables the user to conduct a second interaction using the second channel.

2. The method of claim 1, wherein the server is an orchestrator in a system comprising the orchestrator and a validation service, and wherein the method further comprises:
   storing, by the validation service, the secret received via the first channel; and
   validating, by the validation service, the secret received via the second channel.

3. The method of claim 2, further comprising, after receiving the user device identifier via the first channel:
   transmitting, by the server to a directory, the user device identifier;
   receiving, by the server from the directory, one or more routing identifiers associated with one or more credential identifiers;
   transmitting the one or more credential identifiers to the user device; and
   receiving a selection of a credential identifier in the one or more credential identifiers.

4. The method of claim 3, further comprising:
   obtaining, by the server, the first token using a routing identifier associated with the selected credential identifier, wherein the routing identifier is stored by the server with the first token and the user device identifier.

5. The method of claim 4, further comprising:
   transmitting, by the server to the user device, an authentication request message requesting authentication data;
   receiving, from the user device, an authentication response message comprising the authenticating data; and
   authenticating the user based on the authentication data.

6. The method of claim 1, wherein the server is a software module in a system comprising one or more processors and one or more computer readable media.

7. The method of claim 6, wherein the server is an orchestrator computer.

8. The method of claim 1, further comprising:
   determining, by the server, one or more conditions associated with the first token; and
   storing the one or more conditions with the first token.

9. The method of claim 8, wherein the one or more conditions comprises one or more velocity limits.

10. The method of claim 1, further comprising, after receiving the user device identifier:

transmitting, by the server to a directory, the user device identifier;

receiving, by the server from the directory, a routing identifier and one or more credential identifiers;

transmitting the one or more credential identifiers to the user device; and receiving a selection of a credential identifier in the one or more credential identifiers, wherein the routing identifier is stored by the server with the first token, the first channel identifier, and the user device identifier.

11. The method of claim 1, wherein the secret is a personal identification number or a password.

12. The method of claim 1, wherein the user is a sender, the second interaction is a transaction that transfers value from a sender account associated with the credential to receiver account.

13. The method of claim 1, further comprising, after receiving the user device identifier via the first channel:

transmitting, by the server to a directory, the user device identifier;

receiving, by the server from the directory, one or more routing identifiers associated with one or more credential identifiers;

transmitting the one or more credential identifiers to the user device;

receiving a selection of a credential identifier in the one or more credential identifiers; and obtaining, by the server, the first token using the routing identifier associated with the selected credential identifier, wherein the routing identifier is stored by the server with the first token and the user device identifier, wherein the first token and the routing identifier have a same number of characters.

14. A system comprising:

one or more processors; and one or more computer readable media comprising code, executable by the processor to perform operations comprising:

receiving, from a user device operated by a user via a first channel, a user device identifier;

receiving, from the user device via the first channel, a secret associated with the user;

storing a first token, the user device identifier, and a first channel identifier associated with the first channel, wherein the first token is associated a credential;

receiving, from the user device via a second channel, the user device identifier and the secret, wherein the secret is subsequently validated;

after the secret is validated, obtaining a second token based on the first token; and storing the second token, the user device identifier, and a second channel identifier, wherein the second token is associated with the credential, wherein the first token enables the user to conduct a first interaction with using the first channel and the second token enables the user to conduct a second interaction using the second channel.

15. The system of claim 14, wherein the system comprises an orchestrator, and wherein the steps of receiving the user device identifier, receiving, from the user device via the first channel, the secret associated with the user, storing the first token, the user device identifier, and the first channel identifier associated with the first channel, receiving, from the user device via the second channel, obtaining the second token based on the first token, and storing the second token, the user device identifier, and the second channel identifier, are performed by the orchestrator.

16. The system of claim 14, wherein the system further comprises a validation service, wherein the operations further comprise:

storing, by the validation service, the secret received via the first channel; and validating, by the validation service, the secret received via the second channel.

17. A method comprising:

transmitting, by a user device operated by a user to a server via a first channel, a user device identifier;

transmitting, by the user device to the server via the first channel, a secret associated with the user, wherein the server stores a first token, the user device identifier, and a first channel identifier associated with the first channel, wherein the first token is associated a credential; and transmitting, by the user device to the server via a second channel, the user device identifier and the secret, wherein the secret is subsequently validated, and the server computer obtains a second token based on the first token, and stores the second token, the user device identifier, and a second channel identifier, wherein the second token is associated with the credential, and wherein the first token enables the user to conduct a first interaction with using the first channel and the second token enables the user to conduct a second interaction using the second channel.

18. The method of claim 17, wherein the user device is a mobile phone.

19. The method of claim 17, further comprising, before transmitting the secret:

receiving, by the user device from the server, an authentication request message requesting authentication data; and transmitting, by the user device to the server, an authentication response message comprising the authenticating data, wherein the server authenticates the user based on the authentication data.

20. The method of claim 17, wherein the second interaction is a transfer transaction, and wherein the method further comprises, in the transfer transaction:

transmitting, by the user device to the server, the user device identifier, a receiver device identifier, and a value, wherein in the transfer transaction, the value is transferred from an account associated with the credential to an account associated with a receiver operating a receiver device associated with the receiver device identifier.

* * * * *